(12) United States Patent
Chu et al.

(10) Patent No.: US 9,734,862 B1
(45) Date of Patent: Aug. 15, 2017

(54) METHOD AND APPARATUS FOR WRITING TEST TRACKS ON A MAGNETIC RECORDING MEDIUM

(71) Applicant: Seagate Technology LLC, Cupertino, CA (US)

(72) Inventors: Alfredo Sam Chu, Prior Lake, MN (US); Wenzhong Zhu, Apple Valley, MN (US); Siew Kin Chow, Shakopee, MN (US); Franklin P. Martens, Bloomington, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/294,946

(22) Filed: Oct. 17, 2016

(51) Int. Cl.
*G11B 27/36* (2006.01)
*G11B 20/18* (2006.01)
*G11B 5/09* (2006.01)
*G11B 5/55* (2006.01)
*G11B 5/00* (2006.01)

(52) U.S. Cl.
CPC .......... *G11B 20/1816* (2013.01); *G11B 5/09* (2013.01); *G11B 5/5521* (2013.01); *G11B 2005/0021* (2013.01)

(58) Field of Classification Search
CPC ........ G11B 20/10268; G11B 20/10009; G11B 27/36; G11B 5/012; G11B 2220/20; G11B 5/59627; G11B 20/10046; G11B 20/1217; G11B 5/59688; G11B 20/1403
USPC ...................... 360/18, 20, 22, 24, 25, 53, 75
See application file for complete search history.

(56) References Cited

U.S. PATENT DOCUMENTS

| | | | |
|---|---|---|---|
| 6,487,146 B1 | 11/2002 | Verboom | |
| 7,440,224 B2 | 10/2008 | Ehrlich et al. | |
| 8,885,275 B1 | 11/2014 | Lou et al. | |
| 9,019,646 B2 | 4/2015 | Rausch et al. | |
| 9,153,264 B1 * | 10/2015 | Oberg | G11B 5/59627 |

* cited by examiner

*Primary Examiner* — Nabil Hindi
(74) *Attorney, Agent, or Firm* — Hollingsworth Davis, LLC

(57) ABSTRACT

A first tone is written at a first frequency to outer tracks that surround an inner track of a magnetic recording medium. A second tone is written at a second frequency different from the first frequency to the inner track. The first and second frequencies are both lower than a frequency of an AC erase signal. A crosstrack profile of the inner track is determined based on reading amplitude of the second frequency via the read/write head.

20 Claims, 4 Drawing Sheets

METHOD AND APPARATUS FOR WRITING TEST TRACKS ON A MAGNETIC RECORDING MEDIUM

SUMMARY

The present disclosure is directed to a method and apparatus for writing test tracks on a magnetic recording medium. In one embodiment, a first tone is written at a first frequency to outer tracks that surround an inner track of a magnetic recording medium. A second tone is written at a second frequency different from the first frequency to the inner track. The first and second frequencies are both lower than a frequency of an AC erase signal. A crosstrack profile of the inner track is determined based on reading amplitude of the second frequency via the read/write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
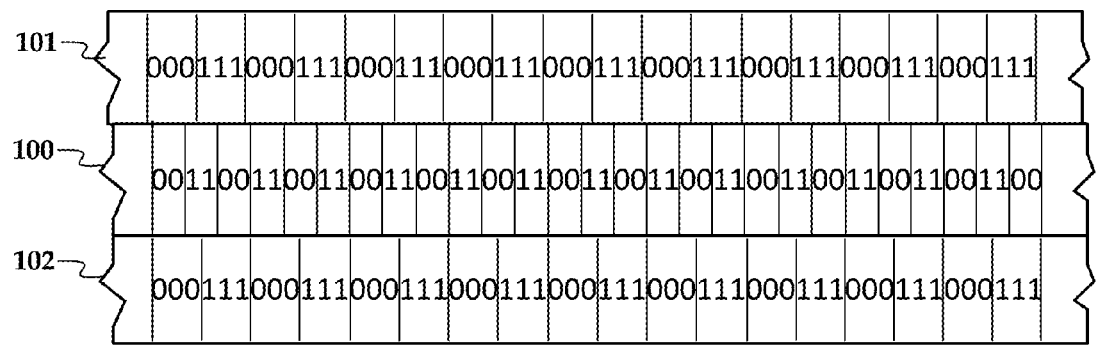
FIG. 1 is a block diagram of a test track according to an example embodiment.

The present disclosure generally relates to data storage devices that utilize magnetic storage media, e.g., disks. These data storage devices utilize write transducers (e.g., a magnetic coil and pole) that apply a changing magnetic field to the recording medium. The applied field changes magnetic orientation in regions of the recording medium, which defines bit boundaries of the stored data. A series of adjacent bits recorded along a circular path defines a data track on the recording medium. A read transducer (e.g., magnetoresistive sensor) can later traverse the track and detect the magnetic transitions. These transitions form a signal which is decoded to recover the stored data.

In the present disclosure, methods and apparatuses are described that can be used to write test data tracks for measurement. For example, the center location and/or width of written test tracks may be measured for some factory operations. The test tracks can be used to calibrate servo control systems, read/write transducers, clearance control systems, etc. Such measurements are used in many types of magnetic disk recording devices, including perpendicular magnetic recording (PMR) and heat-assisted magnetic recording (HAMR).

Some factory servo calibrations involve the measurement of track centers. A magnetic disk typically has servo marks written at different radial and angular locations on the surface(s) of the disk. The servo marks define the locations of the tracks and sectors on the disk. The servo marks are used by a servo control system of the drive assembly to locate tracks when seeking and to follow tracks when reading and writing data. These servo marks include data (e.g., track identifiers, burst patterns) that are read by the read transducer, decoded by drive circuitry, and input to a closed-loop servo controller.

The read and write transducers of the read/write head are offset from one another, e.g., in a downtrack direction. Because the read/write heads are carried by a rotating arm, the heads may be at a skew angle relative to the tracks over much of the disk surface. For example, the skew angle may be at a maximum towards the inner and outer diameters of the disk. When the read transducer is centered over the track at high skew angles, the writer may be significantly offset from track center. As a result, a microjog calibration is performed in the factory at different zones of the recording medium. This involves writing test tracks and reading back the test tracks to measure difference between the written test track center and servo track center. The difference between read and write track centers at different locations is used to build a data set or function that estimates reader-to-writer offset. When the fielded drive writes user data, these microjog values are used by the servo system to offset the crosstrack location head so that the user data tracks are written at the servo-defined track centers.

Another factory (or field) process that may involve writing test track relates to HAMR, also referred to as energy-assisted magnetic recording (EAMR), thermally-assisted magnetic recording (TAMR), and thermally-assisted recording (TAR). A HAMR head uses an energy source such as a laser to create a small hotspot on a magnetic disk during recording. The heat lowers magnetic coercivity at the hotspot, allowing a write transducer to set the magnetic orientation of the grains in the hotspot, after which the hotspot is allowed to rapidly cool. Due to the relatively high coercivity of the medium after cooling, the data is less susceptible to data errors due to thermally-induced, random fluctuation of magnetic orientation known as the superparamagnetic effect. This allows data to be reliably written to a smaller area on a HAMR medium than would be possible using a recording medium with lower coercivity.

In HAMR, a laser or other energy source is coupled to a HAMR read/write head. An optical path (e.g., waveguide) is integrated into the read/write head and delivers the light to a media-facing surface of the read/write head. Because the size of the desired hotspot may be smaller than half a wavelength of the laser light, conventional optical focusers (e.g., lenses) are diffraction limited and cannot be used to focus the light to create the hotspot. Instead, a HAMR head uses a near-field transducer (NFT) to direct energy out of the read/write head.

Generally, the NFT is formed by depositing thin-film of material such as gold, silver, copper, etc., a region near an integrated optics waveguide or some other delivery system. When exposed to laser light that is delivered via the waveguide, the light generates a surface plasmon field on the NFT. The NFT is shaped such that the surface plasmons are directed out of a surface of the write head to generate a hotspot on a magnetic recording medium. A magnetic writer (e.g., magnetic coil and pole) generates a magnetic field encompassing the hotspot, which is heated above the Curie temperature of the recording layer of the medium. The applied magnetic field sets a magnetic orientation within the hotspot that defines written bits of data, but does not affect cooler regions outside of the hotspot which are below the Curie temperature.

Because the size of the hotspot is typically smaller than the magnetic field, the laser power and NFT largely set the size of the written tracks of data. As such, in an initial factory setup, test tracks are written and read back to ensure the laser power and NFT provide the desired hotspot size. This may involve writing test tracks and then reading back a cross track profile (e.g., of amplitude) of the track to determine track width. Other parameters of the track may be determined using this data, e.g., maximum amplitude, track center, profile symmetry, etc. The performance of the laser and NFT can change over time, and so a fielded HAMR drive may also perform occasional testing and recalibration of the laser to ensure performance doesn't degrade over time.

In these factory processes such as calibrating microjog and HAMR laser power, test tracks are written to the recording medium. In order to ensure the test tracks have a cleanly recorded signal, tracks that are adjacent to the test track (e.g., tracks on either side of the test track) may be erased. One way to erase these tracks is to use pure 1T tone (where 'T' refers to the clock period of the write channel), also referred to as an AC erase signal. One issue that has been found with AC erase is that it causes the head to protrude much more than random user data and more than other test tones, such as a 2T tone.

Generally, heat from active components on the read/write head can cause local protrusion at the read/write head due to thermal expansion. Clearance control systems take advantage of this protrusion when setting clearances between the read/write head and recording medium. For example, a heater can built into the read/write head that can selectively control the amount of protrusion by controlling a current sent to the heater. This enables actively controlling the distance between the read\write transducers and the recording medium. However, other components such as magnetic write transducer and, in the case of HAMR, the NFT, also generate heat during operation. The heat of these other components is measured/estimated and accounted for when selecting heater currents for dynamic head-to-media clearance control.

As noted above, use of a 1T erase tone can cause larger than normal protrusion, and this protrusion can be pronounced in HAMR magnetic recording. Also, the HAMR media can be rougher than the PMR media, therefore it is more sensitive to clearance change. When the head is calibrated in the for constant clearance operation, a random data pattern (similar frequency data as what is used by our customer in the field) is used to exercise the writer. The clearance is then calculated based on the user random data. When the 1T data is used to clean up neighboring tracks prior to the microjog calibration, track center location, or any other tests that need to clean the neighboring tracks, the clearance difference between 1T and random data could be more than 1 nm based on a data rate of 1.6 Gbps. When flying the head 1 nm closer to the recording medium than the desired clearance, the reader and/or the NFT element could be damaged due to contact therebetween. Methods and apparatuses are described below that can write and use test tracks without significantly risking head-to-medium contact.

In FIG. 1, a block diagram illustrates a test track 100 according to an example embodiment. The test track 100 is an inner track that is written with a relatively high frequency tone, in this case a 2T signal. Adjacent tracks 101, 102 are outer tracks surrounding the inner track and written with a relatively lower frequency tone, in this case a 3T signal. The tracks 100-102 can be written in any order, although for this application, inner track 100 is written after the outer tracks 101, 102. The tracks 100-102 may be written at conventional track width or such that at least the center track 100 has a reduced width compared to nominal. Guard bands (not shown) may also be written between tracks, e.g., at a different frequency than the center track 100. The adjacent tracks 101, 102 may be written at other frequencies lower than 3T, e.g., 4T, 5T, etc. The adjacent tracks 101, 102 may also be written with mixed tone signals, e.g., 00111, 0001111, etc. Similarly, the center track may also use a lower frequency than 2T, so long as the adjacent track is written at a different frequency. Generally, the thermal protrusion induced by the 2T or lower tones more closely approximates that of user or random data than does a 1T tone.

One technique that has been used to detect track width (and make other track measurements) is to measure a variable gain amplifier (VGA) output while the reader traverses the tracks at different servo offsets. The VGA uses automatic gain control to provide the decoder with a signal of predetermined amplitude. When the read signal has high amplitude (e.g., near the center of the track), the VGA gain will be low. Conversely, when the read signal has low amplitude (e.g., near the edges of the track), the VGA gain will be high. The VGA curve will generally have a u-shape, and the crosstrack amplitude curve of the track corresponds to the inverse of the VGA curve. However, in order for VGA measurements to work reliably, the adjacent tracks should be erased using a 1T signal.

Using the VGA to measure cross track amplitude of a track 100 as shown in FIG. 1 will not provide the desired result due to the 3T adjacent tracks 101, 102. However, in the read channel, there is a sensitive harmonic sensor circuit that is used, e.g., for reading servo burst patterns and/or measuring head-to-media clearance. The harmonic sensor can be used to locate and monitor the center of track 100. The harmonic sensor circuit in the read channel can very accurately detect data of different frequencies. To eliminate the problem of 1T protrusion, the harmonic sensor can be used for tests in the factory or in the field that measure the track center (e.g., microjog) and write with 2T data for the test track and 3T data (or lower frequency) for the adjacent tracks.

Figure 2:
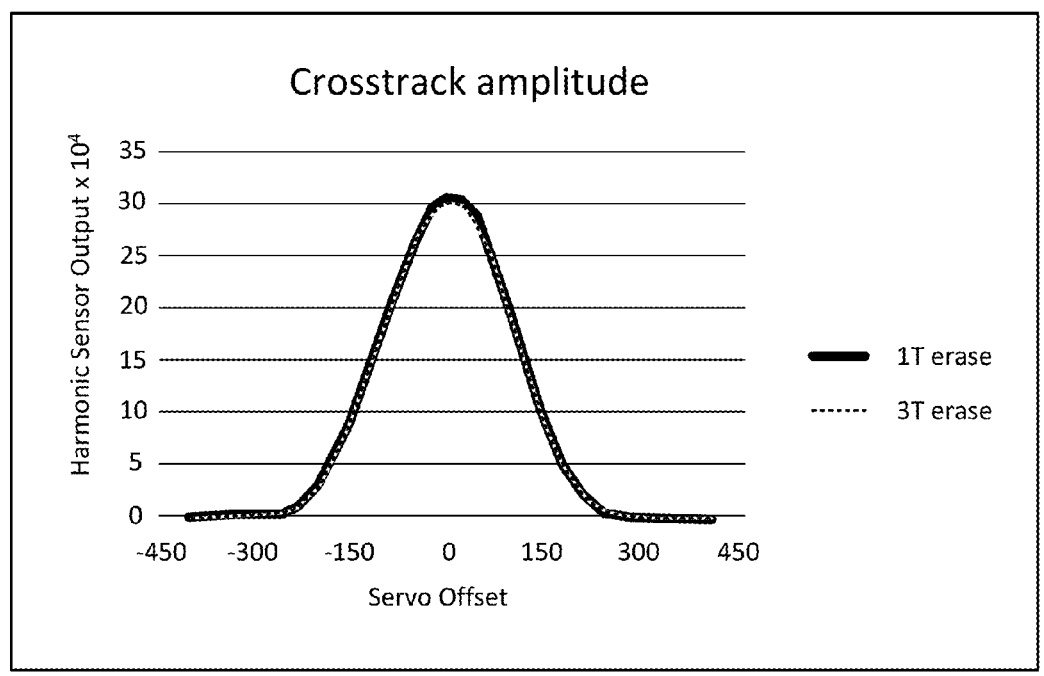
FIG. 2 a graph showing a crosstrack scan result according to an example embodiment.

In FIG. 2, a graph shows a crosstrack scan result according to an example embodiment. The dashed line curve has the center track written with 2T and the side tracks were erased with 3T. The thick, solid curve has the center track written with 2T and the side tracks were written with 1T. The curve shape and cleanliness of the sides are identical whether the adjacent tracks are written with 3T or erased with 1T. Generally, this shows that the harmonic sensor can be effective in measuring crosstrack amplitude profiles of the test track.

There are applications where AC erasing the adjacent tracks is unavoidable. One of these cases is when measuring the reader width using a narrowed center track. To form a narrow track for this case, an erase signal is written on either side of the center track at an offset that results in trimming the track. The write frequency to trim the track should be as high as possible so that the edges of the track profile do not exhibit bumps. This is best accomplished with AC erasure using a 1T signal. In such a case, alternate procedures are proposed below that can mitigate the possibility of inducing head-to-media contact when performing the erasure.

Figure 3:
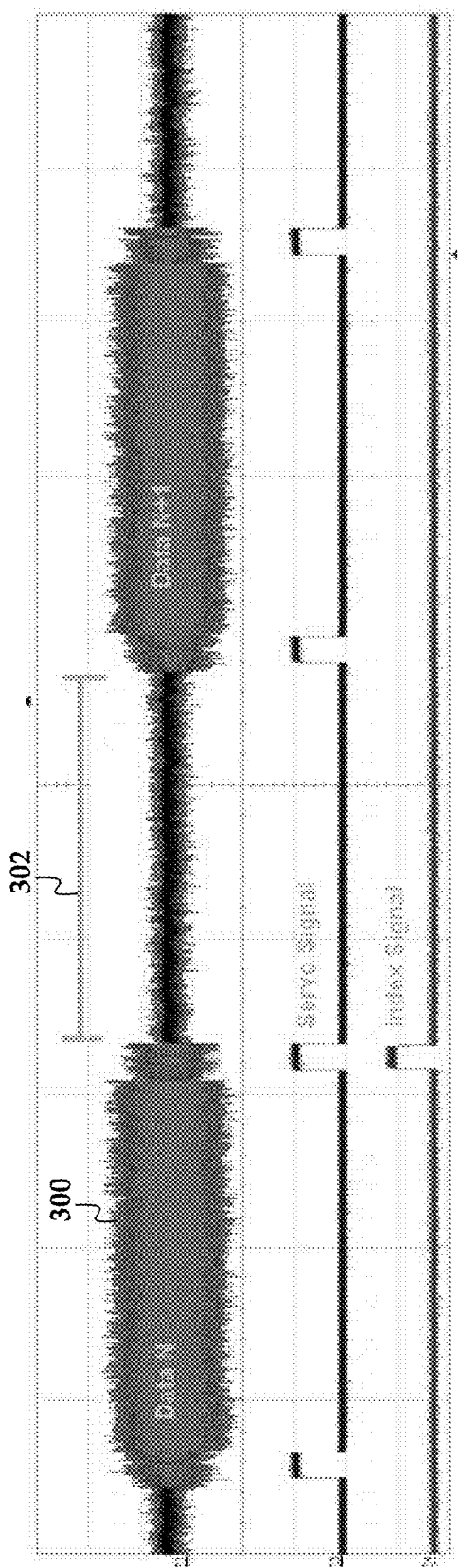
FIGS. 3 and 4 are signal diagrams illustrating test track writing procedures according to example embodiments.

The signal diagram in FIG. 3 shows a procedure for adjacent track erasure according to an example embodiment. Waveform 300 is an example of the write channel erase signal and period 302 is an example of a user data wedge being skipped to reduce the chances of writer-induced thermal protrusion. Generally, the adjacent tracks are erased for every N-wedge(s) where N>1. The harmonic sensor can be used to measure the center track, which has been found to be more robust than VGA. Skipping wedges when erasing will allow the writer to cool down therefore reducing writer-induced, thermal protrusion.

Figure 4:
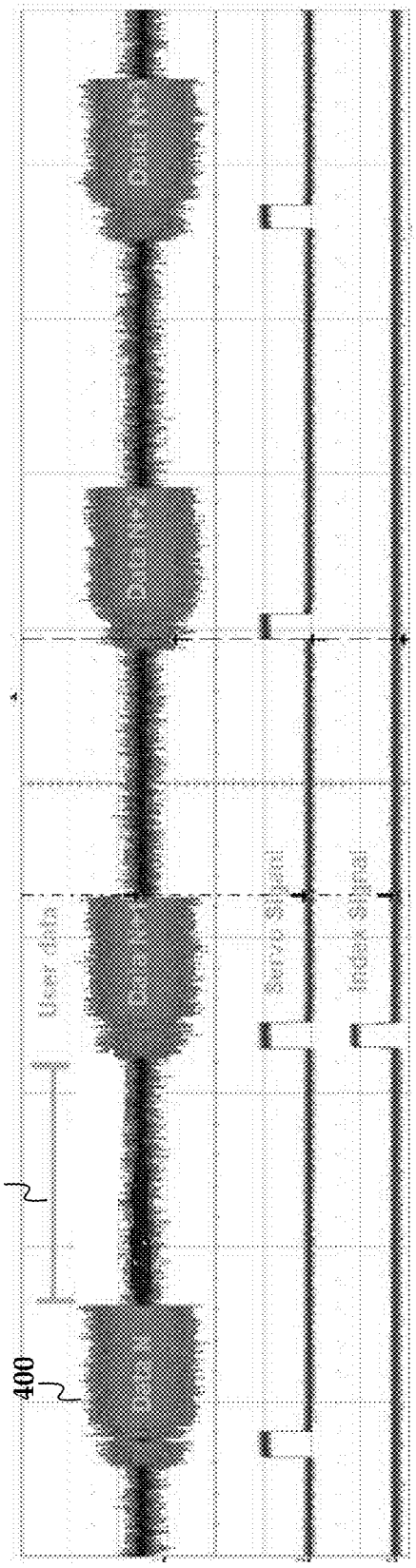

The signal diagram in FIG. 4 shows a procedure for adjacent track erasure according to another example embodiment. Waveform 400 is an example of the write channel erase signal and period 402 shows part of a user data wedge being skipped to reduce the chances of writer-induced protrusion. In this case, a series of consecutive wedge can be written, each wedge written partially. The harmonic sensor is used within the erasure windows to acquire the partial wedge data on the test track.

In the examples shown in FIGS. 3 and 4, the center test tracks are read at locations corresponding to the erased wedges or partial wedges to determine, e.g., a crosstrack profile, track center, etc. In the example of FIG. 3, wedges of the center test track that correspond to the N-erased adjacent wedges are read at different crosstrack offsets. In the example of FIG. 2, partial wedges of the center test track that correspond to the partial adjacent erased wedges are read at different crosstrack offsets.

Note that in some cases, a device can take advantage of the writer induced protrusion due to writing a 1T signal. For example, as shown in FIGS. 3 and 4, the write transducer (e.g., write coil and write pole) are activated by a signal when traversing servo marks. Normally, this would erase the servo data, but in this case, the writer is a HAMR writer, and so the laser is turned off when traversing the servo marks (corresponding to the servo signal traces below the write signal traces 300, 400). Generally, while the writer is on over the servo marks, it can be activated to write at 1T frequency. This can shorten the preheat settle time needed following a seek command. This is a performance improvement for random write seeks.

Figure 5:
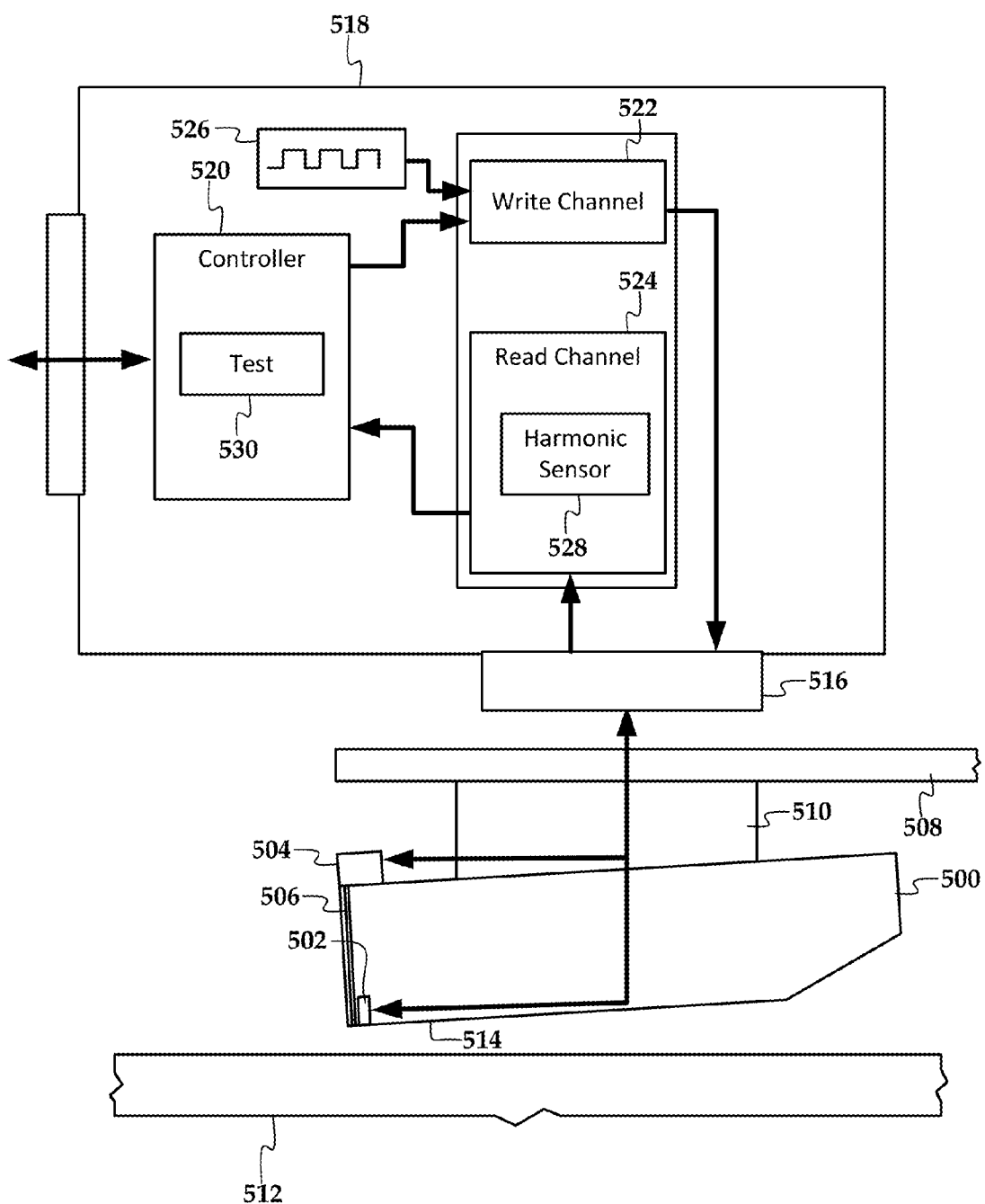
FIG. 5 is a block diagram of an apparatus according to an example embodiment.

In FIG. 5, a block diagram shows an apparatus according to an example embodiment. The apparatus includes a read/write head 500, also referred to as a slider, read head, recording head, write head, etc. The read/write head 500 includes magnetic transducers 502 that at least include a magnetic read transducer (e.g., a magnetoresistive stack) and a magnetic write transducer (e.g., a write coil and pole). The read/write head 500 may optionally be configured as a HAMR read/write head, in which case it may include a laser diode 504 (or other energy source) and a waveguide 506. Other HAMR optical components such as an NFT may be located together with the magnetic transducers 502.

The read/write head 500 is suspended from an arm 508 via a gimbal 510. The arm 508 holds the read/write head 500 over the surface of a recording medium 512, e.g., a spinning magnetic disk. The gimbal 510 and arm 508 apply a downward force on the read/write head 500 which is countered by a thin layer of air (or other gas) between the recording medium 512 and an air bearing surface 514 of the read/write head 500. The air bearing surface 514 includes features that cause the layer of air to maintain a desired separation.

The read/write head 500 is electrically coupled to an interface 516 that may include a flex circuit 516 that carries signals between the read/write head 500 and one or more controller boards 518. The interface 516 may also include electrical components, such as filters, preamplifiers, etc. The controller board 518 includes a controller 520 that may include at least a general-purpose or special-purpose processor. A write channel 522 includes circuitry that facilitates writing data the recording medium 512 via the read/write head 500. A read channel 524 includes circuitry configured to read data from the recording medium 512 via the read/write head 500. Generally, the read and write channels 522, 524 may utilize algorithms for encoding, decoding, symbol detection, error correction, timing correction, etc., that may be implemented as instructions running on the controller 520 or other processors.

The illustrated apparatus is configured (e.g., via test module 530) to write test tracks to the recording medium 512 without using a 1T or AC erase signal. The read/write head 500 is positioned over two or more adjacent tracks on either side of a center track on the recording medium 512 and a relatively low frequency tone (e.g., 3T, from signal generator 526) is written to these outer tracks via the write channel 522. The read/write head 500 is then positioned over the center track and the write channel 522 (e.g., via signal generator 526) causes the read/write head 500 to write a tone to the center track at a second frequency (e.g., 2T). The read/write head 500 then moves at small servo offsets across the center track while reading the recording data via the read channel 524. A harmonic sensor 528 is configured to detect the magnitude of the second frequency at the different servo offsets. A testing module 530 uses these measurements for purposes described above, e.g., microjog calibration, laser calibration, etc.

Figure 6:
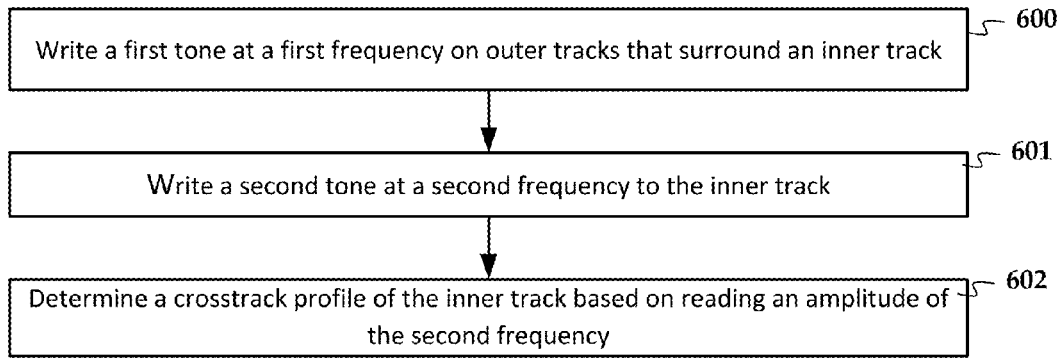
FIGS. 6-8 are flowcharts of methods according to example embodiments.

In FIG. 6, a flowchart shows a method according to an example embodiment. The method involves writing 600, via a read/write head, a first tone at a first frequency to outer tracks that surround an inner track of a magnetic recording medium via a read/write head. A second tone at a second frequency different from the first frequency is written 601 on the inner track. The first and second frequencies are both lower than a frequency of an AC erase signal (e.g., 1T). This may also involve writing a guardband between the inner and outer tracks at a frequency different than the second frequency. A crosstrack profile of the inner track is determined based on reading amplitude of the second frequency via the read/write head.

Figure 7:
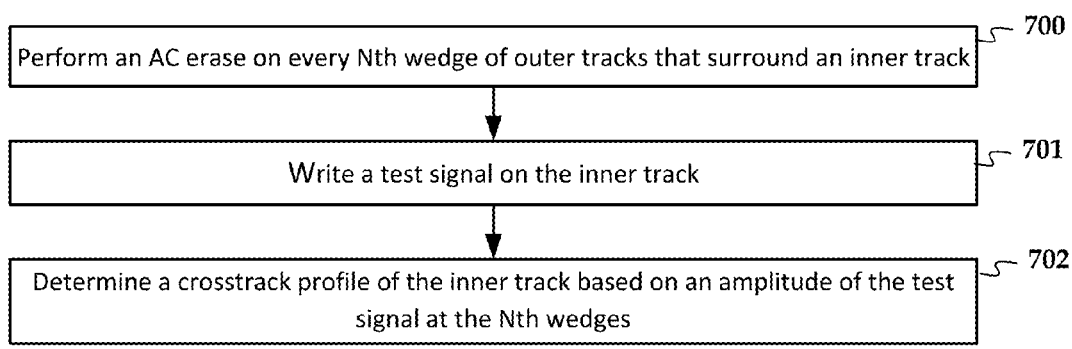
Figure 8:
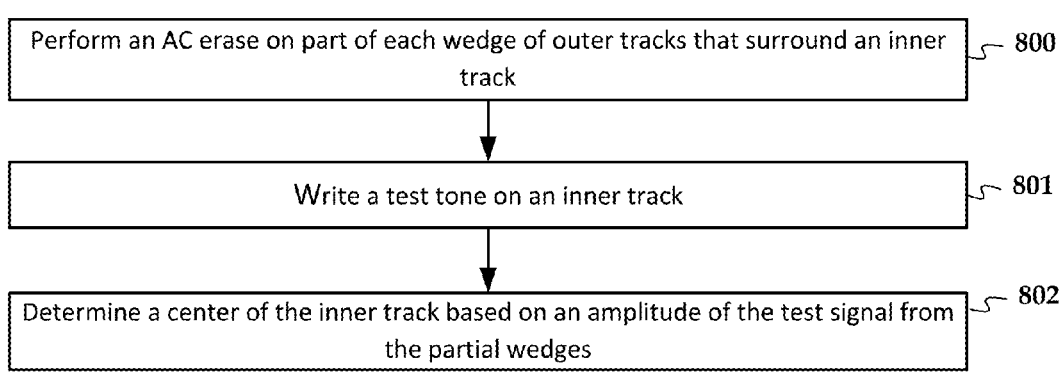

In FIGS. 7 and 8, methods are described for writing test tracks in which an AC erase is interrupted for selected periods during writing of outer adjacent tracks in order to reduce write protrusion due to the AC erase signal (1T). In FIG. 7, a flowchart shows a method according to one of these example embodiments. The method involves performing 700 an AC erase on every Nth wedge (N>1) of outer tracks that surround an inner track. track. A test signal is written 701 to the inner track via a read/write head. A crosstrack profile of the inner track is determined 702 based on reading amplitude of the inner track at locations along the inner track corresponding to the Nth wedges.

In FIG. 8, a flowchart shows a method according to another example embodiment. The method involves performing 800, via a read/write head, an AC erase on part of each wedge of outer tracks that surround an inner track. A test signal is written 801 to the inner track o via the read/write head. A crosstrack profile of the track is determined 802 based on reading amplitude of the inner track at locations along the inner track corresponding to the partial wedges.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    writing, via a read/write head, a first tone at a first frequency to outer tracks that surround an inner track of a magnetic recording medium;
    writing a second tone at a second frequency different from the first frequency to the inner track via the read/write head, the first and second frequencies both being lower than a frequency of an AC erase signal; and
    determining a crosstrack profile of the inner track based on reading an amplitude of the second frequency via the read/write head.

2. The method of claim 1, wherein the determining the crosstrack profile of the inner track comprises:
    moving the read/write head across the inner track at a plurality of servo offsets;
    determining relative amplitudes of the second frequency via a harmonic sensor circuit coupled to the read/write head.

3. The method of claim 1, wherein the second tone comprises a 2T signal.

4. The method of claim 3, wherein the first tone comprises a 3T signal.

5. The method of claim 1, wherein the writing at the first and second frequency induces a heat-induced write protrusion in the read/write head that approximates a writer-induced write protrusion resulting from the writing of random data.

6. The method of claim 1, further comprising determining a track center based on the crosstrack profile.

7. The method of claim 1, further comprising determining a skew-dependent reader-to-writer offset based on the crosstrack profile.

8. The method of claim 1, further comprising determining a power of laser of the read/write head based on the crosstrack profile, the laser heating the recording medium while writing to the recording medium.

9. The method of claim 1, wherein the AC erase signal comprises a 1T signal.

10. The method of claim 1, further comprising writing guard bands between the inner and outer track, the guard band written at a frequency different than the second frequency.

11. An apparatus, comprising:
    an interface circuit configured to communicate with a read/write head that reads from a writes to a magnetic recording medium; and
    a controller coupled to the interface circuit and configured to:
        write, via the read/write head, a first tone at a first frequency to outer tracks that surround an inner track of a magnetic recording medium;
        write a second tone at a second frequency different from the first frequency to the inner track via the read/write head, the first and second frequencies both being lower than a frequency of an AC erase signal; and
        determine a crosstrack profile of the inner track based on reading an amplitude of the second frequency via the read/write head.

12. The apparatus of claim 11, wherein the determining the crosstrack profile of the inner track comprises:
    moving the read/write head across the inner track at a plurality of servo offsets;
    determining relative amplitudes of the second frequency via a harmonic sensor circuit coupled to the read/write head.

13. The apparatus of claim 11, wherein the second tone comprises a 2T signal.

14. The apparatus of claim 13, wherein the first tone comprises a 3T signal.

15. The apparatus of claim 11, wherein the writing at the first and second frequencies induces a heat-induced write protrusion in the read/write head that approximates a writer-induced write protrusion resulting from the writing of random data.

16. The apparatus of claim 11, wherein the controller is further configured to determine a track center based on the crosstrack profile.

17. The apparatus of claim 11, wherein the controller is further configured to determine a skew-dependent reader-to-writer offset based on the crosstrack profile.

18. The apparatus of claim 11, wherein the controller is further configured to determine a power of a laser of the read/write head based on the crosstrack profile, the laser heating the recording medium while writing to the recording medium.

19. The apparatus of claim 11, wherein the controller is further configured to write guard bands between the inner and outer track, the guard bands written at a frequency different than the second frequency.

20. A method, comprising:
    writing, via a read/write head, a 3T tone on outer tracks that surround an inner track of a magnetic recording medium;
    writing a 2T tone to the inner track via the read/write head; and
    determining a crosstrack profile of the inner track based on reading an amplitude of the 2T tone via a harmonic sensor coupled to the read/write head.

* * * * *